Oct. 7, 1958

J. R. GUENTHER 2,855,373

WATER DISPERSIONS OF AN ETHYLENIC MONOMER AND
A POLYESTER OF AN ETHYLENIC DICARBOXYLIC ACID

Filed Nov. 5, 1952

INVENTOR.
JOHN R. GUENTHER

BY
Oscar L. Spencer
ATTORNEY

Oct. 7, 1958  J. R. GUENTHER  2,855,373
WATER DISPERSIONS OF AN ETHYLENIC MONOMER AND
A POLYESTER OF AN ETHYLENIC DICARBOXYLIC ACID
Filed Nov. 5, 1952  3 Sheets-Sheet 3

INVENTOR.
JOHN R. GUENTHER
BY
Oscar L. Spencer
ATTORNEY

United States Patent Office 2,855,373
Patented Oct. 7, 1958

2,855,373

WATER DISPERSIONS OF AN ETHYLENIC MONOMER AND A POLYESTER OF AN ETHYLENIC DICARBOXYLIC ACID

John R. Guenther, Wauwatosa, Wis., assignor to Pittsburgh Plate Glass Company, Pittsburgh, Pa., a corporation of Pennsylvania Application November 5, 1952, Serial No. 318,870

7 Claims. (Cl. 260—29.6)

This invention relates to an emulsion composition and to uses thereof and it has particular relation to an emulsion in water of a material including a polyester of an alpha-beta ethylenic dicarboxylic acid and being polymerizable by addition reaction.

An object of the invention is to provide stable water emulsions of materials including a polyester of an alpha-beta ethylenic dicarboxylic acid.

A second object is to provide a polymerizable polyester material of the foregoing type which can readily be dispersed even in hard water to provide a relatively stable emulsion.

A third object is to provide an emulsion bonding material which after application to a material to be bonded, readily can be cured to a solid, durable resinous state.

A fourth object of the invention is to provide a water emulsion of a copolymerizable mixture of a monomer containing a $>C=CH_2$ group and a polyester of an alpha-beta ethylenically unsaturated dicarboxylic acid, said emulsion being stable over relatively long periods of time.

A fifth object of the invention is to provide a porous reinforcing mat of heterogeneously disposed, uncompacted fibers which can readily be permeated by liquid polymerizable plastics.

A sixth object of the invention is to provide an emulsifiable polyester of an alpha-beta ethylenically unsaturated dicarboxylic acid in which the emulsifying agent is reacted with the polyester.

A seventh object is to provide a sizing material for heterogeneously disposed fibers which will have a strong tendency, when sprayed on a mat of such fibers, to flow along the latter to points of intersection between fibers and there to accumulate and provide a bond between them without unduly coating portions between the intersections.

An eighth object is to provide an efficient method of providing bodies of copolymers of monomers containing a $>C=CH_2$ group and polyesters of alpha-beta ethylenically unsaturated acids which are reinforced by mats of fibers relatively uniformly distributed in the copolymers.

It is to be understood that no attempt has been made to arrange the objects in any particular order with respect to importance. It is also to be understood that all of the objects need not necessarily be attained simultaneously in particular applications of the invention.

These and other objects of the invention will be apparent from consideration of the following specification and claims:

For a better understanding of the invention, reference may be had to the specification and drawings, in which.

Figure 1:
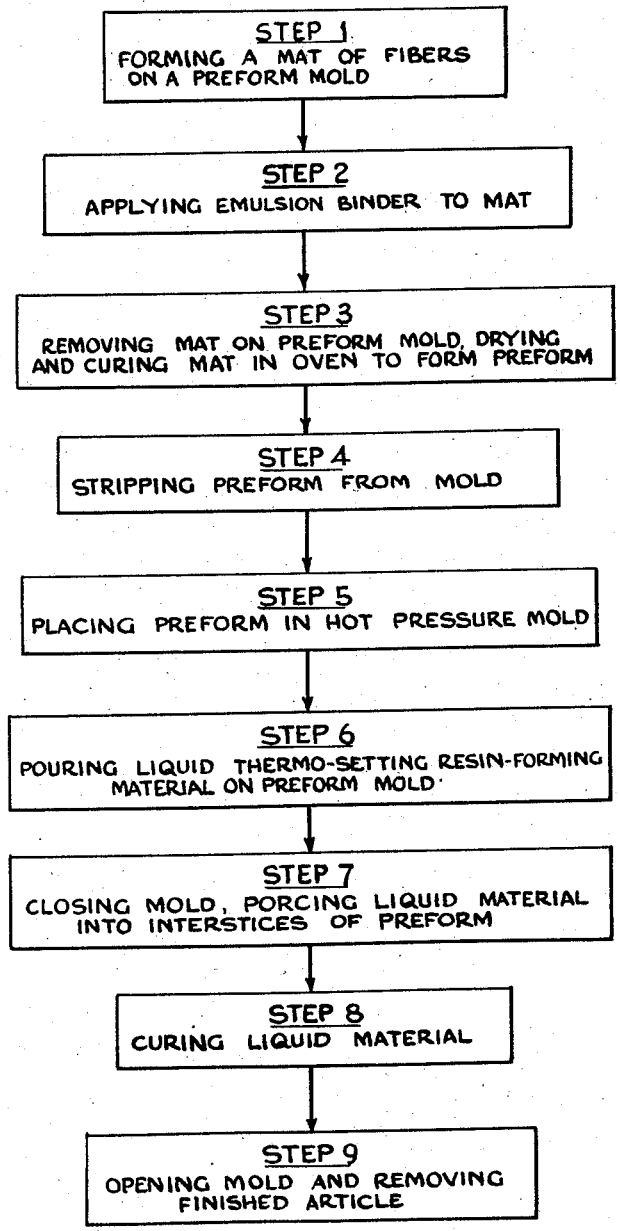
Fig. 1 is a flow sheet illustrating the process.

The formation of polyesters of glycols and alpha-beta ethylenically unsaturated dicarboxylic acid has heretofore been disclosed. Likewise the polymerization by addition reactions of these polyesters with or without added monomers containing a $>C=CH_2$ group is well known in the art. The polyesters and more especially the copolymerizable mixtures thereof with the monomers possess highly valuable properties. For example, they may be subjected to polymerization reaction by application of light or by heating, preferably in the presence of a heat polymerization catalyst to provide durable resinous bodies even at moderate temperatures and pressures and within a very short period of time. It is also a characteristic of the polymerization reactions that they are not attended by the evolution of water or other by-products which must be eliminated from the products if a substantial degree of durability is to be obtained.

A large number of such resinifiable materials are disclosed in U. S. Patent 2,593,787 to Earl E. Parker, U. S. patents also disclosing such copolymerizable mixtures include 2,409,633; 2,443,735; 2,443,741; 2,450,552 and many others. Likewise, the polyesters and the copolymerizable mixtures thereof with monomers containing the $>C=CH_2$ group are extensively discussed in the prior literature, e. g. Industrial and Engineering Chemistry, December 1939, page 1512, and again in the same publication January 1940, page 64.

The present invention concerns the preparation of emulsions of the foregoing polymerizable materials and it further concerns the use of such emulsions for purposes of providing a sizing or binder for fibrous materials such as glass fibers. The invention is based upon the discovery that long chain hydroxy ethers such as are obtained by condensation of alkyl glycols such as ethylene glycol or propylene glycols or butylene glycols which are usually termed polyalkylene glycols, may successfully be included in the polyesters of alpha-beta ethylenically unsaturated acids to provide a reacted or combined emulsifying agent which not only imparts a capacity for emulsification with water to form an oil-in-water dispersion to the polyester, but also renders the latter capable of effecting water emulsification of mixtures thereof with monomers containing a $>C=CH_2$ group. It is a further feature of the invention that the water emulsions of the foregoing polyesters and copolymerizable mixtures thereof with compounds containing the $>C=CH_2$ group possess such characteristics that when they are applied to a mat of fibers such as glass fibers by such method as spraying or the like, they exhibit a pronounced tendency to flow downwardly along the fibers to any points of intersection or contact between contiguous fibers and there to collect in a mass or clot so that when the material is dried and polymerized, the fibers are effectively bonded together at points of intersection with only thin coatings of material between such points. The mats, herein termed preforms, are highly porous throughout and readily can be impregnated with liquid polymerizable materials such as solutions of polyesters of alpha-beta ethylenic dicarboxylic acids and liquid monomeric compounds containing the $>C=CH_2$ group and being solvents for the polyesters. The liquid impregnating, resinifiable material subsequently can be cured to a solid, resinous state in which the material is firmly bonded to the fibers as a solid, continuous matrix, filling much, if not all, of the interstices of the preform.

As previously indicated, the preparation of polyesters of alpha-beta ethylenic dicarboxylic acids and polyhydric alcohols, such as the several glycols or copolymerizable mixtures of these polyesters, and ethylenically unsaturated monomers containing the $>C=CH_2$ group at this time constitutes an extensively developed art. Many patents and articles, of which those previously mentioned are illustrations, are available, and may be referred to in the selection of components of polyesters and mixtures of polyester and monomers useful in this invention. In the practice of this invention, a polyglycol may be added to any of the available glycol-polybasic acid mixtures prior to esterification or to the preformed esters from such mixtures to provide polyesters which are inherently emulsifiable in water and which are adapted to be combined with many monomers such as are disclosed in the foregoing patents and articles.

The dicarboxylic acids containing an alpha-beta ethylenic group include, for example, maleic acid, fumaric acid, aconitic acid, mesaconic acid, citraconic acid, ethylmaleic acid, pyrocinchoninic acid, xeronic acid, itaconic acid and others. Most of these are alpha-beta dicarboxylic as well as alpha-beta ethylenic.

The alpha-beta ethylenic dicarboxylic acids may likewise be mixed with dicarboxylic acids which are free of ethylenic unsaturation and being represented by phthalic acid, terephthalic acid or aliphatic dicarboxylic acids such as succinic acid, adipic acid, suberic acid, azelaic acid, sebacic acid, dimethyl succinic acid and chlorinated derivatives of these acids such as tetrachlorophthalic acid. These acids, free of ethylenic groups, tend to extend the length of the polyester chains without introducing reactive groups capable of causing linking or latticing effects. They tend to increase the flexibility of the ultimate resinous product and, provided some dicarboxylic acids containing alpha-beta ethylenic unsaturation are present, they are, for some purposes, desirable. Since the polyesters do not necessarily include a dicarboxylic acid free of ethylenic unsaturation, no minimum proportion of the latter can be established but 0.25 mole of the latter acid per mole of the alpha-beta ethylenically unsaturated dicarboxylic acid is suggested as a practicable limit, if the acid free of ethylenic unsaturation is to be employed.

The polyesters may also include a certain amount of fatty acids and notably of drying oil acids which have a tendency to produce air-drying characteristics in the copolymerizable mixtures. Usually, the dicarboxylic acids will be employed in substantial stoichiometric excess with respect to the fatty acids. And, indeed, as in the case of the dicarboxylic acids free of ethylenic groups, the fatty acids are not necessary constituents of the polyesters. A range of 2 to 12 moles of dicarboxylic acids per mole of the fatty acids is suggested as constituting a practicable working range.

The polyesters of the present invention include a polyhydric alcohol which usually is a glycol. Such glycols may include, although they are not necesarily limited to, ethylene glycol, diethylene glycol, triethylene glycol, 1,3-dipropylene glycol, 1,2-propylene glycol and alpha or beta butylene glycol. The glycols usually have a carbon atom content below about 10. These glycols are usually employed in stoichiometric equivalency or in a slight excess thereof with respect to the total of the carboxylic acids present in the polyester. The excess may, for example, be within a range of about 5 to 20 percent or typically 10 percent.

For purposes of imparting water dispersability to the polyesters prepared as above described, a polyalkylene glycol is incorporated before, during, or after the main reaction of esterification. The invention includes the use of any of the higher polyalkylene glycols, for example, those derived from monoglycols containing 2 to 4 or more carbon atoms per molecule. These include ethylene glycol, propylene glycol and trimethylene glycol, butylene glycols such as butandiol 1,2; butandiol 2,3; butandiol 1,3; tetramethylene glycol, isobutylene glycol, pinacol and and higher glycols. The polyglycols derived from compounds containing the group

are especially suitable.

Numerous polyethylene glycols suitable for incorporation in the polyester mixtures are available commercially, a satisfactory series being sold under the trade name of "Carbowaxes." The "Carbowaxes" are sold by the Carbide and Carbon Chemicals Corporation and are understood to have average molecular weights of about 1000 or above, but below about 6000, and those containing materials having average weights between 1000 and 1540 or somewhat above, are especially suitable for application in the practice of the present invention. In some instances the material of high molecular weight is mixed with some polyethylene glycol of intermediate weight. For example, Carbowax 1500 is understood to be a mixture of equal weights of a material having a molar weight of about 1540 and a material having molar weight of about 300. This invention includes the use of these mixtures. Carbowax 1540 is understood to have an average molecular weight of 1540. These polyethylene glycols are understood to be polyethers obtained by condensation of ethylene glycol. Likewise, they include at least some hydroxyls and therefore are capable of reaction with any carboxyls available in the polybasic acid or the polyester molecules.

The preparation of the polyesters from any of the foregoing components follows conventional procedure and involves a typical esterification reaction, preferably in the presence of an acid catalyst or other catalyst of esterification. The reaction may also include the addition of a small amount of xylene which constitutes a refluxing medium. The mixture may be heated to refluxing temperature or to a temperature within a range of 150 to 190 or 200 degrees C. For purposes of preventing undue oxidation of the unsaturated components of the reaction mixture, it is usually desirable to conduct the reaction under a blanket of inert gas such as carbon dioxide or nitrogen or the like. The reaction is continued until water of reaction substantially ceases to evolve, or until the mixture has reached a reasonably low acid value, e. g. an acid value within a range of about 5 to 50. The resultant polyesters normally will be extremely viscous when cold and may even be solids, but when they are heated they become fluid and can readily be admixed with monomers containing a $>C=CH_2$ group.

The invention includes the addition of the polyalkylene glycol to the reaction mixture of the original acid components and the polyhydroxy compound. For example, diethylene glycol or propylene glycol and a "Carbowax" may be mixed with maleic anhydride or fumaric acid and the mixture may be heated under inert gas until a mixed ester is obtained. This may be incorporated with a monomer containing a $>C=CH_2$ group and the mixture may be emulsified with water to provide a binder for fibrous mats as herein disclosed. The polyalkylene glycol obviously may take the place of a portion of the dihydric alcohol usually employed in the reaction.

The polyesters containing the polyalkylene glycol component and the monomers are inherently capable of polymerization by addition reaction between the ethylenic groups. Catalysts such as benzoyl peroxide may be added to such polyesters for the purposes of increasing the rate of heat polymerization of the material. Accordingly, the present invention includes the emulsion of the foregoing polyesters by agitating them with or without added solvent such as xylene or toluene to provide a stabilized emulsion. However, in most instances, it is preferable to include with the polyester a monomer containing the >C=CH$_2$ group. These monomers may be included in a portion of about 5 to 50 percent with respect to the total copolymerizable mixture.

Usually the monomer is added while the polyester containing the polyalkylene glycol is relatively hot, e. g. at a temperature within a range of 100 to 150 degrees C. whereby to attain ready solution of the two components. At these temperatures, many of the monomers are relatively reactive and the mixtures tend to gel prematurely. In order to obviate such gelling, it is customary to include in one of the components of the mixture an appropriate gelation inhibitor. These include quaternary ammonium salts as disclosed in the previously mentioned Parker patent. In lieu of these, any of the more conventional gelation inhibitors such as hydroquinone, tertiary butyl catechol may be incorporated into the polyester or into the monomer, dependent upon the solubility characteristics of the material employed as an inhibitor, to obviate premature gelation of the mixture.

For purposes of increasing the speed of copolymerization of the mixture upon the fibers, a catalyst such as a catalyst of heat polymerization is usually added to the liquid mixtures of polyester and the monomer. These catalysts include benzoyl peroxide, cumene hydroperoxide, lauroyl peroxide or any of the conventional peroxidic or similar catalysts of addition reaction. Naturally, the catalyst should be added to the copolymerizable mixtures while they are relatively cool in order to obviate any undue tendency to premature gelation.

The foregoing polymerizable materials containing a polyalkylene glycol can be emulsified with water by simple agitation at normal room temperatures. The emulsifiable compositions may be added over a relatively wide range of proportions such as about 2½ to 50 or 60 percent solids based upon the total emulsion mixture. Especially favorable results are obtained in the preparation of stock emulsions by the incorporation of approximately equal parts by weight of water and resinifiable mixture. These mixtures are stable for several weeks and they can then be diluted to spraying consistency or such other consistency as may be desired by the addition of water. Mixtures of about 10 percent by weight solids content are found to be very satisfactory for spraying purposes. The water employed in the diluting operation may be hard or soft as may be available for the purpose. Emulsions in which the polyalkylene glycol content is low, for example, 5 percent of the polyester component or less tend to be unstable in hard water. However, in products in which the polyalkylene glycol constitutes about 15 to 25 percent or more of the polyester component, a high degree of emulsion stability is attained even in the hard waters which may occasionally be employed in the diluting operation. If a supply of soft water such as distilled water is assured, low percentages of polyalkylene glycol may be employed as the emulsifying agent.

Emulsifiable polyesters containing alpha-beta ethylenically unsaturated acid containing a cooked-in or reacted polyalkylene glycol component and mixtures of such polyesters and monomers containing the >C=HC$_2$ group may be employed for various coating operations. They may also be employed to impregnate various porous materials such as magnesium castings. Accordingly, the invention is not limited to any particular application of the emulsions. However, as previously indicated, these emulsions of the present invention are especially advantageous as bonding agents in a fibrous mat.

The mat to which the emulsion is applied as binder may be formed of loosely and randomly arranged fibers such as short lengths of fiber glass that provide a highly permeable body. Within the broader concepts of this invention, any convenient method of forming the mat, such as spreading out a loose bat upon a support may be employed. However, a preferred and advantageous method involves passing a current of a gas (e. g. air) carrying the fibers suspended therein through a foraminous form to collect the fibers at random thereupon.

The emulsion can be applied to the mat upon the form by an immersion process followed by draining or otherwise removing the excess of liquid. However, the emulsion of copolymerizable polyester and monomer preferably is applied to this mat by spraying, for example, while the mat is supported upon a mold or form designed to assist in maintaining it in desired shape. Subsequently, the mat is dried and cured, preferably in the absence of mechanical pressure, for example, by baking it in an oven heated to the curing temperature while a gaseous medium such as air is circulated through the oven for purposes of removing water vapor. The resultant dried mats are highly porous and, as previously stated, the fibers are bonded together at points of intersection, even at points relatively deep in the mat, owing to the tendency of the emulsion to run along the fibers and collect at any points of contact between contiguous fibers. The remaining portions of the fibers have only thin films of the bonding agent.

The interpolymerizable mixture is poured upon the preform preferably while it is disposed in a heated mold corresponding in contour to the articles to be formed. The mold is then closed with sufficient pressure to ensure that the plastic mixture or solution is thoroughly forced through the interstices of the preformed mat. The mold is maintained closed for a sufficient time to effect cure of the resin to a hard, durable finish.

Figure 3:
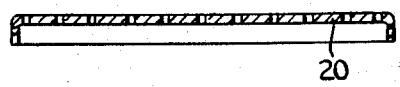
Fig. 3 is a sectional view of a foraminous support or mold upon which the pre-forms are made up.
Figure 4:
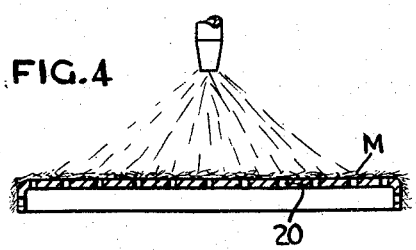
Fig. 4 is a sectional view of a pre-form upon a support while it is being treated with binder emulsion.

A convenient embodiment of apparatus and the several steps employed in the preparation of an article such as a tray by application of the principles of the present invention are illustrated in a simplified or diagrammatic manner and without an attempt to maintain any relative scale in proportions in the drawings. In the drawings a mold, form or support for the preparation of the preforms is shown at 20 in Figs. 2, 3 and 4 and comprises a foraminous structure of desired contour formed, for example, of sheet metal or of screen wire and having holes 21, through which air or similar gaseous medium carrying suspended fibrous particles such as pieces of chopped glass fibers or roving can be drawn or blown. The fibers are collected upon the form surface as a mat of relatively uniform thickness and in which the fibers are heterogeneously disposed, at least in the plane of the article so that the fibers cross, or contact each other at many spaced points, to form a highly porous or permeable structure.

Figure 2:
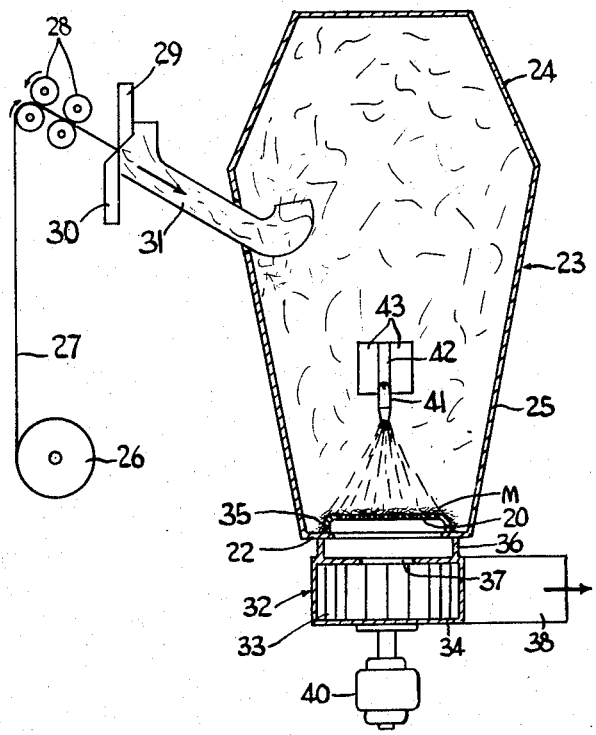
Fig. 2 is a diagrammatical view of an appropriate preform forming machine.

For purposes of forming the mat on this mold the latter may be disposed on the bottom 22 of a chamber 23 shown in Fig. 2 which chamber comprises upper and lower frusto-conical sections 24 and 25.

Assuming that chopped glass roving or other continuous fibers are employed as a source of the fibers for the preform, a supply 26 thereof upon a spool or reel may be employed. The roving in the form of a multiplicity of fibers indicated at 27 is drawn upwardly by an appropriate roller system such as the driven rollers 28 actuated by any convenient source of power (not shown) and after passing between the rollers is chopped or sheared into short sections of desired length by means of an appropriate cutting system such as shear blades 29 and 30, which may be automatically actuated by any convenient mechanism (not shown). The sections of fiber, or roving, are received into a chute 31 through which they pass to the chamber 22.

A rotary pump or suction fan 32 having a rotor 33 in a case 34 is disposed below the chamber bottom 22 and an opening 35 formed in said bottom registers with and is connected by collar 36 with the inlet opening 37 of the case 34 of the fan. Air is sucked through these openings into the case and is thrown by the rotor 33 outwardly through a discharge conduit 38. A partial vacuum is thus maintained in the chamber so that the fibers are drawn downwardly through the chute 31 into the chamber 23 where they are whirled about in erratic flight by the eddy currents in the chamber and ultimately are sucked down as a mat M upon preform mold or form 20. Rotor 33 is supported upon the shaft 39 and is driven by the motor 40, or any other convenient mechanism.

In the operation of the unit of mechanism in accordance with step 1 of the process, roving 27 is fed to the shear mechanisms 29 and 30 where it is chopped into pieces of appropriate length, e. g., 1 or 2 inches. The pieces are sucked down the chute 31 by the fan 32 and are whirled about in considerable turbulence by the air currents in the chamber 33. Ultimately, the fibers are laid down as a mat of relatively uniform thickness of heterogeneously disposed fibers having very slight, if any, cohesion with respect to each other.

In order to attain cohesion of the mat, in step 2 binder is applied either with or without suction from fan 32. The binder preferably comprises a water emulsion of a polyester of an alpha-beta ethylenic dicarboxylic acid which has been modified with a polyalkyl glycol such as polyethylene glycol in the manner already described, and in most instances is further admixed with or dissolved in a monomer containing a $>C=CH_2$ group. When such binder is sprayed upon the mat M, it will tend to flow along the fibers and thus seek the points of intersection between the latter, whereby to bind the mat together without excessively coating or smearing the portions of the fibers between the points of intersection. The spraying operation may be performed by directing a conventional spray nozzle 41 through an opening such as a slot 42 formed between the plastic flaps 43 mounted in an opening in the wall of the lower section 25 of the chamber. It usually is desirable to provide means (not shown) to rotate form 20 in its own plane, or else to provide a plurality of slots in the wall of the section, thus admitting of spraying of the mat from a plurality of directions to obtain a high degree of uniformity in the application of the emulsion.

Figure 5:
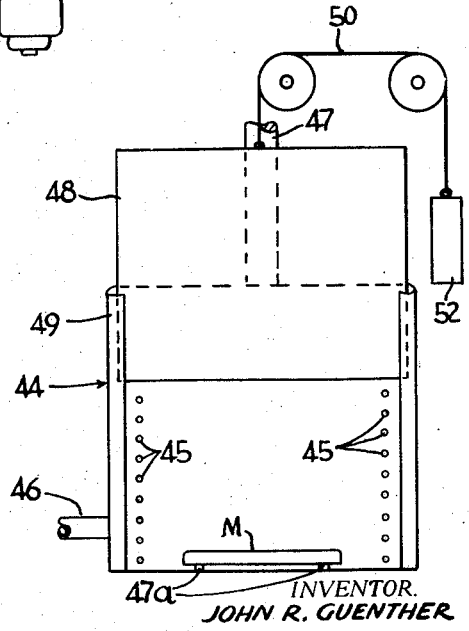
Fig. 5 is a diagrammatical view of an oven employed to dry and cure the pre-form.

In step 3 of the process, when the mat has been sufficiently sprayed, and while it is still upon the form 20 it may be removed from chamber 23 for drying and curing. This operation conveniently is conducted in an oven such as the oven 44, shown diagrammatically in Fig. 5, which, as shown, is provided with heating means such as electrical resistance elements designated at 45. The oven also may be provided with means for circulating drying gases such as air or carbon dioxide. This means includes an inlet conduit 46 and an outlet conduit 47. Blocks 47a or other support hold the mat in position to maintain free flow of air thereabout. In order to speed up the drying and curing operation the gases may be preheated by means (not shown) before introduction into the chamber.

The chamber or oven also includes a door 48, indicated diagrammatically in the drawing in open position and being disposed in guides 49 whereby it can be raised or lowered at will to permit the insertion of the supports 20 bearing the sprayed mats thereupon. To facilitate operation of the door its weight may be balanced by a system comprising a cord 50 trained about pulleys 51 and being attached to a counter-weight 52.

Figure 6:
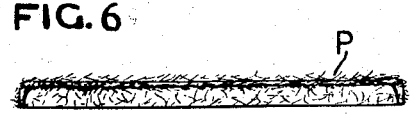
Fig. 6 is a sectional view of a preform after curing.

When the oven is in operation the door 48 is closed, the oven is heated and gases are circulated through conduits 46 and 47 until the water vapor is expelled and the resins are adequately cured to provide a mat which is sufficiently cohered by the plastic material that it can be removed from the support 20 in step 4 and can then be subjected to the subsequent operations involved in the application of the liquid plastic material such as a polyester of an alpha-beta ethylenic dicarboxylic acid and a monomer containing the $>C=CH_2$ group. It will be observed that the preforms, as they are obtained from the oven 44, are highly porous at the surface as well as internally, because, at no time during the forming or curing operation, is the fibrous mat subjected to any substantial degree of mechanical pressure. The preform P, after drying and curing and removing from the support 20, is indicated at Fig. 6.

In the drawing, the preform is indicated as being in the form of a simple panel or tray of more or less nonplanar outline. It will be appreciated that any other desired form may be imparted thereto by the appropriate shaping of the supporting form or mold upon which the fibers are to be deposited in the chamber 23. Usually, the preform will correspond fairly closely to the size and shape of the ultimate article to be formed. The preform is especially adapted for filling with a liquid resinifiable material that can be cured in a mold so that the plastic permeates and fills the interstices to a large degree. However, the preforms have utility in other fields. For example, they may be used as air filters, etc. The cured preform is composed of short lengths of fibers laid at random in the plane of the article and being bonded together at points of intersection of the fibers by clot-like masses of cured plastic so that the preform is highly permeable both at its surface and internally, both to gaseous and to liquid fluids.

Figure 7:
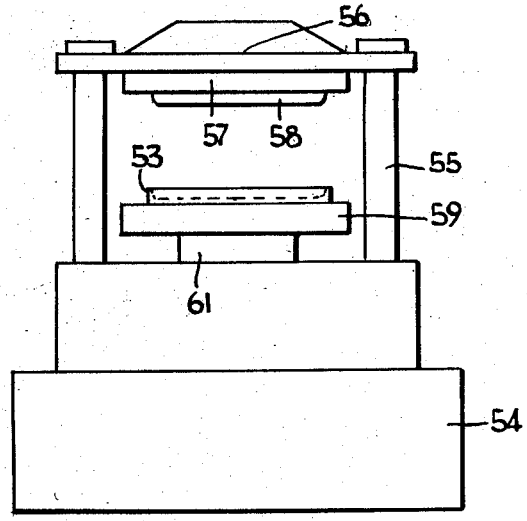
Fig. 7 is a diagrammatic view designed to cure and form the completed article.

In order to impregnate the preforms with liquid resinifiable material and to cure the same whereby to obtain the completed articles, the preform may be subjected to step 5 in which it is disposed in the female section of a mold 53 as shown in a press in Fig. 7. This press includes a base portion 54, uprights 55 and a crosshead interconnecting the uprights indicated at 56. This crosshead carries an upper platen 57 upon which is secured the male section 58 of a mold. Sections 53 and/or 58 may be heated by means such as heating coils (not shown). The female section 53 is carried upon a lower platen 59 which in turn is mounted upon a vertical piston 61 actuated by fluid pressure in a cylinder (not shown).

Figure 8:
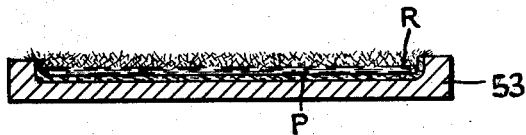
Fig. 8 is a sectional view of a preform in the female section of the mold of the press shown in Fig. 7.

In step 6 of the process, liquid resinifiable material in appropriate quantity to impregnate the fibrous preform is poured into the preform as indicated at R in Fig. 8. This material may comprise a copolymerizable mixture of a monomer and a polyester of an alpha-beta ethylenic dicarboxylic acid. It will be appreciated that one or both of the mold sections 53 and 58 are heated to a temperature sufficient to cure the resinifiable material.

Figure 9:
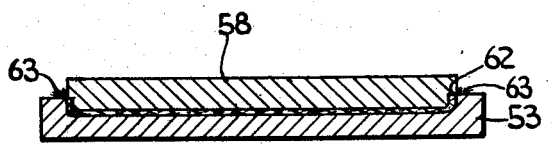
Fig. 9 is a sectional view showing the article and the mold sections in position during the molding operation.

In step 7 after the resinifiable material is introduced into the preform P the piston 61 is operated to bring the lower mold section into register with the upper section thus forcing the liquid material into the interstices of the preform. It will be observed in Fig. 9 that the upper mold section 58 is formed with shoulders at 62 designed to form the upper edge of the articles to be molded. The edges of the mold sections are also disposed in shearing relation with respect to the upper edges of the lower mold cavity. When the mold section 53 is elevated to compress the preform and the liquid resinifiable material in the cavity of said section, any flash material exuded around the top of the cavity as well as the projecting ends of the fibers of the preform are shearingly engaged between the edges of the two sections so that all projecting material is smoothly sheared off as indicated at 63 around the edges of the article and at the same time the edge portions of the latter are effectively sealed. Any other form of trimming device than the shearing edges could be employed and the cured articles could be removed from the mold and trimmed as a separate step, if so desired.

Figure 10:
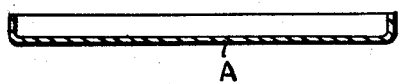
Fig. 10 is a sectional view of completed article after removal from the mold.

When the resinous material in the mold cavity has been cured to a hard, resistant state, the mold cavity may be opened by lowering the piston 61. The molded article contained in cavity may then be removed and is indicated in its finished form as A in Figure 10 and is a hard, strong body of plastic reinforced by the fibers embedded therein.

While a simple, tray-like body is shown by way of illustration, the invention is not limited to such structures. The same method may be applied to the construction of other non-planar bodies such as boats, containers, airplane wings and fuselages and many other structures. Simple flat panels may also be formed in the same way. In the specific illustration, the liquid homogeneous material to be polymerized as a matrix is poured upon the bonded mat and then forced into the interstices of the mat by the male element of the mold. However, it is within the scope of the broader concepts of the invention to suck the liquid into the preform or to force it in under a hydrostatic head or in any other way to force it in under a differential of pressure between all or a part of the interior and the exterior.

The following examples illustrate the preparation of emulsifiable polyesters in accordance with the provisions of the present invention.

Example I

A polyester suitable for emulsification was prepared by the reaction of 1 mole of maleic anhydride with 1.1 moles of diethylene glycol, and 5 percent by weight (based upon the total amount of polyester) of a polyethylene glycol known as Carbowax 1540W which is understood to have an average molecular weight of 1540. The reaction mixture was heated to esterification temperature for a peroid of time sufficient to evolve water and to reduce the acid number below 50.

The modified polyester thus obtained, while sufficiently hot to attain a liquid state, was stabilized with 0.02 percent by weight, based upon the polyester of tertiary butyl catechol and a monomer, namely diallyl phthalate, in an amount to provide a mixture comprising 70 parts by weight of polyester and 30 parts by weight of the diallyl phthalate, was added. This mixture was suitable for use as an emulsifiable binder resin for fiber preforms. Before the resultant emulsifiable polyester was incorporated with water, a catalyst of polymerization, namely 4 percent by weight of a commercial product known as Luperco ATC and which comprised a mixture of equal parts by weight of benzoyl peroxide and tricresyl phosphate, was added. The mixture was emulsifiable without added emulsifiers to form oil-in-water emulsions.

A preferred method of preparing an emulsion of this polyester comprised making up a stock comprising 50 percent by weight of the polyester in water by merely agitating the liquid copolymerizable mixture with the water. The latter could be distilled or tap water, as preferred. The emulsion so obtained was stabled for a period of days. When this emulsion was to be applied to a mat of glass fibers to effect bonding thereof, it was thinned down to spraying consistency, namely to a consistency of 10 percent by weight of solids in water. It could be sprayed upon a mat such as M obtained in the apparatus of Fig. 2. When the mat was cured in the oven at 300 degrees F. to remove water and to effect interpolymerization between the constituents of the resin, the resulting mat was found to be well-bonded and the color was good. Higher temperatures of curing could be employed but at 350 degrees F. and above, the product tended to darken somewhat and for some applications might be objectionable. The preform as thus obtained was placed in a mold section, namely the section 53, as shown in the drawing in Fig. 8.

A homogeneous mixture of 2 parts by weight of a polyester of an alpha-beta ethylenic dicarboxylic acid and 1 part by weight of a monomer containing a $>C=CH_2$ group was then poured into the preform in an amount to fill the interstices of the preform and to provide a smooth and complete finished article. The polyester, in this instance, was of propylene maleate phthalate in which the two acid components were in equal molar proportions and the monomer was styrene. The mixture also included a peroxide catalyst of polymerization. The press while hot, was closed and was maintained in closed position until the resin was adequately hardened, which in this instance, required about 3 minutes. (Naturally, the time of cure will depend upon the rate of cure of the particular polyester-monomer system and also upon the mass of material to be cured.) At the end of the curing time, the press was opened and the body, in cured condition, was removed from the mold. The surfaces of the body were good and the fibrous mat constituting the reinforcement was well-impregnated by the resin so that the individual fibers thereof were embedded in a matrix of solid plastic.

Example II

In this example, the base resin employed in preparing the emulsifiable bonding material comprised the same components as the corresponding element in Example I. However, 10 percent by weight, based upon the reactive components, of Carbowax 1540W was employed to attain water dispersibility from the reaction mixture. The polyester in an amount of 70 parts by weight was incorporated while hot with 30 parts by weight of diallyl phthalate. This monomer, of course, could be replaced by styrene if so desired, or by any other of the monomers or equivalent monomers herein disclosed. The mixture was catalyzed with 4 percent by weight of Luperco ATC of the composition above described. Subsequently, a stock emulsion comprising 50 percent by weight of solids in water was made up. It was highly stable and could be kept for days. This emulsion was thinned to 10 percent solids and was sprayed upon a suitable glass fiber mat upon foraminous support 20. The mat was dried and cured in the oven 44 under a vigorous circulation of heated gases. This mat could be inserted in the mold section 53, a polyester-monomer mixture could be poured therein, the mold closed and the mixture cured as in Example I.

Example III

In this example, an emulsifiable bonding resin was prepared by heating together 3 moles of maleic anhydride, 1 mole of phthalic anhydride, 4.4 moles of diethylene glycol and 5 percent by weight, based upon the reactive components, of a polyethylene glycol, namely Carbowax 1540W. The resultant polyester was again stabilized by the addition of 0.02 percent by weight of tertiary butyl catechol and the mixture, while still hot, was incorporated with monomer which was again diallyl phthalate, the proportions being the same as those described in Example I. Luperco ATC in an amount of 4 percent by weight based upon the copolymerizable mixture was added and the mixture was made up as a stock emulsion of 50 percent solids in water, which emulsion was subsequently thinned down to a spraying concentration of 10 percent by weight. Mats of glass fibers prepared as previously described were sprayed with the emulsion and were cured in the oven to obtain a good bond between the fibers at points of intersection. The resultant preforms were then placed in the mold of the press shown in the drawings, a liquid, homogeneous mixture of polyester and monomer was added, the press was closed to force the mixture into the interstices of the preform. The mixture was then cured to provide a strong, well-reinforced body.

Example IV

The techniques of this example were identical with those described in Example III except that 7.5 percent by weight of Carbowax 1540W was employed to impart emulsifiability to the binder resin.

Example V

In this example, the emulsifiable polyester was identical with that described in Example I except that it was modified by the incorporation of 15 percent instead of 5 percent of the polyethylene glycol and the proportion of diethylene glycol was equi-molar with respect to the maleic anhydride. The emulsions obtained by use of this resin were highly stable, even after dilution to a concentration of 5 percent by weight of solids in water. These emulsions could be employed for spraying mats of glass fibers in order to bind the latter together in the manner already described in connection with the preceding examples.

*Example VI*

In this example, a polyester was prepared comprising equal moles of maleic anhydride, ethylene glycol and 21.8 percent by weight, based upon the reactive components, of a polyethylene glycol designated as Carbowax 1540W and comprising large amounts of polyglycol of a molecular weight of about 1500. The resultant polyester was stabilized with 0.02 percent based upon the polyester of tertiary butyl catechol and the mixture, while hot, was admixed with diallyl phthalate in such amount as to provide a copolymerizable liquid solution comprising 70 percent by weight of the polyester and 30 percent by weight of the monomer. The mixture was catalyzed with 4 percent by weight of Luperco ATC and was made up into a stock solution in the manner described above. Subsequently, the stock solution was diluted to a solids content of 10 percent by weight. Emulsions of 10 percent concentration and even 5 percent concentration were stable for periods of weeks. Mats of glass fibers when sprayed with the emulsions and cured in the oven with vigorous circulation of air were well bonded together. The mats could be treated with resinifiable liquid such as a copolymerizable mixture of a polyester and a monomer as herein described and cured in the press apparatus as described in the preceding examples.

*Example VII*

The procedure of this example is identical with that described in Example VI except that in this instance diallyl phthalate in the emulsifiable binder is replaced by an equal amount by weight of styrene. The resultant polyester-styrene mixture can be catalyzed and made up into water emulsions which are stable for many weeks. Mats bonded by means of this material are highly coherent and can be employed as preforms in the manner already described.

*Example VIII*

In this example, a polyester was prepared by heating together 1 mole of diethylene glycol, 1 mole of itaconic acid and 20 percent, based upon the reactive components of Carbowax 1540W. The resultant polyester was duly stabilized with tertiary butyl catechol and diallyl phthalate was added in an amount to provide a mixture which was 70 percent polyester and 30 percent of diallyl phthalate. This mixture was catalyzed as previously described, emulsified and employed for bonding preforms of fiber glass which were susceptible of impregnation with a liquid copolymerizable mixture, such as described in the preceding examples, to be cured to provide hard, durable reinforced bodies.

*Example IX*

This example constitutes a duplication of Example VIII except that diallyl phthalate constituting the monomer, is replaced with styrene.

*Example X*

In this example, a polyester was prepared comprising 1 mole of maleic acid, 1 mole of phthalic anhydride, 2.2 moles of diethylene glycol and 20 percent, based upon the reactive components, of the polyester of Carbowax 1540W. This polyester was then incorporated with tertiary butyl catechol in an amount of 0.02 percent by weight based upon the polyester and to 70 parts by weight of the polyester mixture, was added 30 percent by weight of styrene. This mixture was further catalyzed with 4 percent by weight of Luperco ATC. The mixture was then emulsified with water to provide a stock material containing 50 percent by weight of solids. The emulsion was stable for several days.

In these examples polyethylene glycol may be replaced by higher ethers of other glycols such as 1,2-propylene glycol, trimethylene glycol, alpha-butylene glycol, tetra methylene glycol.

*Example XI*

An emulsifiable polyester was prepared by esterification of a mixture of maleic anhydride in a ratio of 20 moles, diethylene glycol in a ratio of 22 moles and Carbowax 1540W in a ratio of 5 percent based upon the mixture. This polyester while hot and fused was mixed with 0.2 percent by weight of tertiary butyl catechol and diallyl phthalate in a proportion of 30 parts by weight was incorporated with 70 parts by weight of the polyester. This mixture was catalyzed with 4 percent by weight of Luperco ATC and the mixture was made up to sprayable concentration (about 10 percent by weight solids) in water. The resultant emulsion was sprayed on a mat of glass fibers and cured to provide a highly porous, but firmly coherent, body ideally suited for further impregnation with a resinifiable material.

*Example XII*

An emulsifiable polyester was prepared by esterification of maleic anhydride (1 mole), diethylene glycol (1.1 mole) and 5 percent by weight, based upon the mixture, of a Carbowax of a molecular weight of 4000. The resultant polyester was made up into binder emulsions comprising respectively 10 percent and 50 percent total solids in water.

*Example XIII*

This example constitutes a repetition of Example XII except that the Carbowax of a molecular weight of 4000 was replaced by one of a molecular weight of 6000.

*Example XIV*

Example XII was repeated except that a Carbowax of a molar weight of 1000 was employed.

In the several examples, the polyethylene glycol was added to the polyhydric alcohol-polybasic acid mixture before the esterification reaction. It is to be understood that it could be added during the course of the reaction. Likewise the polybasic acid or acids and the polyhydric alcohol may be preliminarily esterified and the polyethylene glycol component may then be added and cooked in by heating the mixture to reaction temperature. A still further permissible procedure involves heating the polyethylene glycol with all or a portion of the polybasic acid or acids, to effect esterification, then adding the polyhydric alcohol and reacting it with the residual carboxyls.

The examples emphasize the use of liquid, copolymerizable mixtures of a monomer containing the group $>C=CH_2$ as an agent for filling the preform mat. It has many advantages from the standpoint of binding properties, strength, hardness, resistance to heat and chemicals and its capacity to flow into the interstices of the preform and there to set at moderate temperatures and at low pressures to provide sound fiber-reinforced bodies.

Likewise, the use of glass fibers as the reinforcing medium has been stressed. Its strength and its capacity to bond to the resins is outstanding. However, apart from the merit involved in the association of the several components in a unitary system, it is to be observed that often the preferred components can be replaced in part by other materials to form products which are still satisfactory for some applications. Thus, glass fibers in the several examples may sometimes be replaced by other fibers such as cotton, asbestos, or the like.

The resinifiable solution employed to impregnate the oven-cured mats may sometimes be replaced in part or completely with other resinifiable materials such as urea-formaldehyde condensation products, melamine-formaldehyde condensation products, epoxy compositions such as polyethers of bisphenol A and epichlorohydrins or polymerizable liquids such as methyl methacrylate, acrylonitrile, etc. Thermoplastic resins such as vinyl chloride, vinyl acetate and copolymers thereof may also be fused and employed to impregnate the mats. Naturally, none of these possesses all of the merits of the liquid mixtures of monomers and polyesters of alpha-beta dicarboxylic acids but for some applications they may be acceptable.

I claim:

1. A water-dispersible material comprising an interpolymerizable mixture of from about 5 to 50 percent by weight, based on the total weight of the interpolymerizable mixture, of (A) a monomer containing a $>C=CH_2$ group selected from the group consisting of diallyl phthalate and styrene; and (B) a polyester of an alpha-beta ethylenic dicarboxylic acid, a glycol containing from 2 to 10 carbon atoms and a polyalkylene glycol having an average molecular weight above about 1000 and below about 6000, said polyalkylene glycol being present in an amount of from about 5 to 25 percent by weight based upon the total amount of said polyester (B).

2. A water-dispersible material as defined in claim 1 in which said polyester (B) includes a dicarboxylic acid free from aliphatic carbon-to-carbon unsaturation.

3. A water-dispersible material as defined in claim 1 in which said polyester (B) includes a mixture of polyalkylene glycols having an average molecular weight about 1000 and below about 6000.

4. A water dispersion of the mixture defined in claim 3.

5. A water-dispersible material comprising an interpolymerizable mixture of from about 5 to 50 percent by weight, based on the total weight of the interpolymerizable mixture, of (A) a monomer containing a $>C=CH_2$ group selected from the group consisting of diallyl phthalate and styrene; and (B) a polyester of an alpha-beta ethylenic dicarboxylic acid, a glycol containing from 2 to 10 carbon atoms and a mixture of polyalkylene glycols having an average molecular weight above about 1000 and below about 6000, there being present in said mixture a polyalkylene glycol having a molecular weight of 300, said mixture of polyalkylene glycols being present in an amount of from about 5 to 25 percent by weight based upon the total amount of said polyester (B).

6. A water dispersion of the interpolymerizable mixture defined in claim 5.

7. A water-dispersible material as set forth in claim 5 wherein the mixture of polyalkylene glycols have an average molecular weight between about 1000 and about 1540.

References Cited in the file of this patent

UNITED STATES PATENTS

| | | |
|---|---|---|
| 2,166,542 | Bradley | July 18, 1939 |
| 2,255,313 | Ellis | Sept. 9, 1941 |
| 2,388,206 | Boulton et al. | Oct. 30, 1945 |
| 2,495,640 | Muskat | Jan. 24, 1950 |
| 2,531,275 | Jones | Nov. 21, 1950 |
| 2,562,878 | Blair | Aug. 7, 1951 |
| 2,634,245 | Arndt | Apr. 7, 1953 |
| 2,665,263 | Howald | Jan. 5, 1954 |

OTHER REFERENCES

Biefeld et al.: "Sizes for Glass Textiles for Reinforcing Polyester Plastics," American Dyestuff Reporter, August 18, 1952.